JOSEPH THIEM AND WILHELM THIEM, OF LAWRENCEBURG, INDIANA.

*Letters Patent No. 86,710, dated February 9, 1869.*

IMPROVED COMPOSITION FOR MOULDINGS.

The Schedule referred to in these Letters Patent and making part of the same.

*To whom it may concern:*

Be it known that we, JOSEPH THIEM and WILHELM THIEM, both of Lawrenceburg, Dearborn county, Indiana, have invented a new and useful Composition for Moulding, &c.; and we hereby declare the following to be a full, clear, and exact description thereof.

This invention relates to a composition, which is formed of a mixture of cheap ingredients, and which becomes so hardened by the application of heat, after it has been made to assume the desired form, as to remain unaffected by varying heat or moisture in the air.

The ingredients are mixed together in about the following proportions:

Sawdust, four pints; milk-curd, one pint; slaked lime, one-third of a pint; cotton, one ounce, more or less.

This composition is used in the formation of ornamental mouldings, escutcheons, &c., and many other articles of use and ornamentation.

Sawdust from black walnut is used when a dark color is desired. Pine or poplar gives a lighter shade; and in this way the color may be varied to suit the purpose, or the color may be varied by the intermixture of any other article, as lamp-black, &c.

The aforementioned ingredients are mixed thoroughly together, when sufficiently moist to adhere in a mass, and, after moulding or pressing into any desired form, the object is hardened by heat. It may then receive a coat of varnish or paint.

The cotton may be used in greater or less proportion, as greater or less strength is required, as it is intended to give adhesiveness.

We do not confine ourselves to the exact proportions stated; but

What we claim as new, and desire to secure by Letters Patent, is—

A composition, formed substantially as herein described, for the purposes stated.

In testimony of which invention, we hereunto set our hands.

JOS. THIEM.
WILHELM THIEM.

Witnesses:
GEO. H. KNIGHT,
JAMES H. LAYMAN.